(12) United States Patent
Gao et al.

(10) Patent No.: US 10,397,627 B2
(45) Date of Patent: Aug. 27, 2019

(54) DESKTOP-CLOUD-BASED MEDIA CONTROL METHOD AND DEVICE

(71) Applicant: HUAWEI TECHNOLOGIES CO., LTD., Shenzhen, Guangdong (CN)

(72) Inventors: Lin Gao, Nanjing (CN); Xin Dai, Nanjing (CN)

(73) Assignee: HUAWEI TECHNOLOGIES CO.,LTD., Shenzhen (CN)

( * ) Notice: Subject to any disclaimer, the term of this patent is extended or adjusted under 35 U.S.C. 154(b) by 0 days.

(21) Appl. No.: 15/068,289

(22) Filed: Mar. 11, 2016

(65) Prior Publication Data
US 2016/0198208 A1 Jul. 7, 2016

Related U.S. Application Data

(63) Continuation of application No. PCT/CN2014/074665, filed on Apr. 2, 2014.

(30) Foreign Application Priority Data

Sep. 13, 2013 (CN) .......................... 2013 1 0418721

(51) Int. Cl.
*H04N 21/81* (2011.01)
*H04N 21/226* (2011.01)
*H04N 21/472* (2011.01)
*H04N 21/485* (2011.01)
*H04N 21/2662* (2011.01)
*H04N 21/6332* (2011.01)

(52) U.S. Cl.
CPC ....... *H04N 21/2662* (2013.01); *H04N 21/226* (2013.01); *H04N 21/472* (2013.01); *H04N 21/47202* (2013.01); *H04N 21/4858* (2013.01); *H04N 21/6332* (2013.01); *H04N 21/8173* (2013.01)

(58) Field of Classification Search
CPC ............. H04N 21/2662; H04N 21/226; H04N 21/472; H04N 21/47202
See application file for complete search history.

(56) References Cited

U.S. PATENT DOCUMENTS 8,949,316 B2 * 2/2015 Lauwers ................... G06F 3/16
709/203
2006/0209206 A1 9/2006 Wang et al.
(Continued)

FOREIGN PATENT DOCUMENTS

CN 102611809 A 7/2002
CN 1571508 A 1/2005
(Continued)

*Primary Examiner* — Sumaiya A Chowdhury
(74) *Attorney, Agent, or Firm* — James Anderson Harrison (57) ABSTRACT

Embodiments of the present invention, relating to the field of desktop cloud applications, provide a desktop-cloud-based media control method and a device, so as to reduce a bandwidth occupied by transmission of a multimedia data stream in a media control process. The method includes: acquiring, by a client, a multimedia data stream, displaying the multimedia data stream, receiving a control instruction sent by a cloud server, and performing a corresponding control operation on the displayed multimedia data stream according to the control instruction. The method embodiment is used for media control.

13 Claims, 4 Drawing Sheets

(56) References Cited

U.S. PATENT DOCUMENTS

| | | |
|---|---|---|
| 2008/0022199 A1 | 1/2008 | Sako et al. |
| 2008/0034029 A1 | 2/2008 | Fang et al. |
| 2008/0228865 A1 | 9/2008 | Cruzada et al. |
| 2013/0117416 A1 | 5/2013 | Sun et al. |
| 2013/0139103 A1 | 5/2013 | Laborczfalvi et al. |
| 2014/0095726 A1 | 4/2014 | Fok et al. |
| 2014/0250447 A1* | 9/2014 | Schink ............. H04N 21/44218 725/10 |
| 2014/0334614 A1* | 11/2014 | Mezhibovsky ... H04M 3/42382 379/88.01 |
| 2014/0334618 A1 | 11/2014 | Tang et al. |
| 2015/0194136 A1* | 7/2015 | Diard .................... G09G 5/393 345/547 |

FOREIGN PATENT DOCUMENTS

| | | | |
|---|---|---|---|
| CN | 1839618 | A | 9/2006 |
| CN | 101198067 | A | 6/2008 |
| CN | 102177693 | A | 9/2011 |
| CN | 103139202 | A | 6/2013 |
| JP | 2010009147 | A | 1/2010 |
| JP | 2012133472 | A | 7/2012 |
| WO | 2004102949 | A1 | 11/2004 |

\* cited by examiner

DESKTOP-CLOUD-BASED MEDIA CONTROL METHOD AND DEVICE

CROSS-REFERENCE TO RELATED APPLICATIONS

This application is a continuation of International Application No. PCT/CN2014/074665, filed on Apr. 2, 2014, which claims priority to Chinese Patent Application No. 201310418721.X, filed on Sep. 13, 2013, both of which are hereby incorporated by reference in their entireties.

TECHNICAL FIELD

The present invention relates to the field of desktop cloud applications, and in particular, to a desktop-cloud-based media control method and a device.

BACKGROUND

In a desktop cloud application scenario, a user may access a cloud server by using a thin client, the cloud server provides a corresponding cloud desktop for the thin client, and the user accesses the cloud desktop by using the thin client to implement access to a cross-platform application program. That is, only one thin client device or any other device that may be connected to a network is required, and the cloud desktop provided by the cloud server for the thin client and various applications provided by the cloud server for the thin client may be accessed by using a dedicated program or a browser.

In the prior art, the thin client may be externally connected to a multimedia peripheral (such as a camera or a microphone), and acquires a multimedia data stream by using the multimedia peripheral, and a still screen image, mouse device data, keyboard data, and the multimedia data stream that is acquired by using the multimedia peripheral may be transmitted between the thin client and the cloud server, where the multimedia data stream may be a video data stream or an audio data stream. For transmission of the multimedia data stream, the thin client transmits the multimedia data stream to the cloud server, the cloud server decodes the multimedia data stream and transmits a decoded multimedia data stream to the thin client, and the thin client displays the decoded multimedia data stream. In addition, when the user needs to perform control (for example, recording of a video) on the displayed multimedia data stream, the user sends a control instruction to the cloud server by using the cloud desktop, and the cloud server performs processing on the multimedia data stream according to the control instruction.

It may be learned from the foregoing that the multimedia data stream needs to be transmitted by the thin client to the cloud server, decoded by the cloud server, and then transmitted to the thin client for being displayed by the thin client. Because a transmission process of the multimedia data stream generally occupies a great bandwidth, for example, for an application scenario of a high-definition multimedia camera, a bandwidth of a video transmitted between the thin client and the cloud server needs to be over 20 Mbps to guarantee transmission smoothness of the multimedia data stream. In a case of a low bandwidth, a delay may occur in transmission of the multimedia data stream, and an obvious pause occurs when the multimedia data stream is being displayed, thereby reducing user experience.

SUMMARY

Embodiments of the present invention provide a desktop-cloud-based media control method and a device, so as to reduce a bandwidth occupied by transmission of a multimedia data stream in a control process of the multimedia data stream.

To achieve the foregoing objective, the following technical solutions are used in the embodiments of the present invention:

According to a first aspect, a desktop-cloud-based media control method is provided, including:

acquiring, by a client, a multimedia data stream, where the client includes a client applied to a desktop cloud scenario, and in the desktop cloud scenario, a cloud server builds a corresponding cloud desktop for the client, and the client accesses the cloud server by using the cloud desktop;

displaying, by the client, the multimedia data stream; and receiving, by the client, a control instruction sent by the cloud server, and performing a corresponding control operation on the displayed multimedia data stream according to the control instruction, where the control instruction is an instruction delivered by a user to the cloud server by using the cloud desktop.

In a first possible implementation manner of the first aspect, the displaying, by the client, the multimedia data stream includes:

decoding, by the client, the multimedia data stream, and displaying a decoded multimedia data stream.

With reference to the first possible implementation manner of the first aspect, in a second possible implementation manner, the displaying a decoded multimedia data stream includes:

determining a location of a display window, where the display window is used to display the decoded multimedia data stream, the location of the display window is corresponding to a multimedia display area, and the multimedia display area is an area for displaying a multimedia data stream on the cloud desktop; and displaying the decoded multimedia data stream by using the display window.

With reference to the second possible implementation manner of the first aspect, in a third possible implementation manner, the determining a location of a display window includes:

receiving location information that is of the multimedia display area on the cloud desktop and sent by the cloud server; and determining the location of the display window according to the location information of the multimedia display area, so that the location of the display window is the same as a location of the multimedia display area on the cloud desktop.

With reference to the second possible implementation manner or the third possible implementation manner of the first aspect, in a fourth possible implementation manner, the receiving a control instruction sent by the cloud server, and performing a corresponding control operation on the displayed multimedia data stream according to the control instruction includes:

receiving a window adjustment instruction sent by the cloud server; and adjusting the display window according to the window adjustment instruction.

With reference to any one of the first aspect to the fourth possible implementation manner of the first aspect, in a fifth possible implementation manner, the receiving a control instruction sent by the cloud server, and performing a corresponding control operation on the displayed multimedia data stream according to the control instruction includes:

receiving a first operation instruction sent by the cloud server;

determining a first multimedia data substream according to the first operation instruction;

encoding the first multimedia data substream to obtain a corresponding multimedia file; and sending the multimedia file to the cloud server.

With reference to the first aspect or any one of the first to the fourth possible implementation manner of the first aspect, in a sixth possible implementation manner, the receiving a control instruction sent by the cloud server, and performing a corresponding control operation on the displayed multimedia data stream according to the control instruction includes:

receiving a second operation instruction sent by the cloud server;

determining a second multimedia data substream according to the second operation instruction; and sending the second multimedia data substream to the cloud server, so that the cloud server encodes the second multimedia data substream to obtain a corresponding multimedia file.

With reference to the first aspect or any one of the first to the sixth possible implementation manner of the first aspect, in a seventh possible implementation manner, the method further includes:

configuring a multimedia plug-in;

the displaying, by the client, the multimedia data stream includes:

displaying the multimedia data stream by using the multimedia plug-in; and the receiving a control instruction sent by the cloud server includes:

receiving, by using the multimedia plug-in, the control instruction sent by the cloud server.

According to a second aspect, a client is provided, including:

an acquiring unit, configured to acquire a multimedia data stream, where the client includes a client applied to a desktop cloud scenario, and in the desktop cloud scenario, a cloud server builds a corresponding cloud desktop for the client, and the client accesses the cloud server by using the cloud desktop;

a displaying unit, configured to display the multimedia data stream acquired by the acquiring unit, where:

the acquiring unit is further configured to receive a control instruction sent by the cloud server; and a processing unit, configured to perform a corresponding control operation on the displayed multimedia data stream according to the control instruction received by the acquiring unit, where:

the control instruction is an instruction delivered by a user to the cloud server by using the cloud desktop.

In a first possible implementation manner of the second aspect, the displaying unit is specifically configured to: decode the multimedia data stream acquired by the acquiring unit, and display a decoded multimedia data stream.

With reference to the first possible implementation manner of the second aspect, in a second possible implementation manner, the displaying unit is specifically configured to: determine a location of a display window, and display the decoded multimedia data stream by using the display window, where:

the display window is used to display the decoded multimedia data stream, the location of the display window is corresponding to a multimedia display area, and the multimedia display area is an area for displaying a multimedia data stream on the cloud desktop.

With reference to the second possible implementation manner of the second aspect, in a third possible implementation manner, the displaying unit is specifically configured to: receive location information that is of the multimedia display area on the cloud desktop and sent by the cloud server, and determine the location of the display window according to the location information of the multimedia display area, so that the location of the display window is the same as a location of the multimedia display area on the cloud desktop.

With reference to the second possible implementation manner or the third possible implementation manner of the second aspect, in a fourth possible implementation manner, the acquiring unit is further configured to receive a window adjustment instruction sent by the cloud server; and the processing unit is further configured to adjust the display window according to the window adjustment instruction.

With reference to the second aspect or any one of the first to the fourth possible implementation manner of the second aspect, in a fifth possible implementation manner, the acquiring unit is further configured to receive a first operation instruction sent by the cloud server, where the first operation instruction is an instruction delivered by the user to the cloud server by using the cloud desktop;

the processing unit is further configured to: determine a first multimedia data substream according to the first operation instruction acquired by the acquiring unit, and encode the first multimedia data substream to obtain a corresponding multimedia file; and the client further includes: a first sending unit, configured to send the multimedia file obtained by the processing unit to the cloud server.

With reference to the second aspect to the fourth possible implementation manner of the second aspect, in a sixth possible implementation manner, the acquiring unit is further configured to receive a second operation instruction sent by the cloud server, where the second operation instruction is an instruction delivered by the user to the cloud server by using the cloud desktop;

the processing unit is further configured to determine a second multimedia data substream according to the second operation instruction; and the client further includes: a second sending unit, configured to send the second multimedia data substream determined by the processing unit to the cloud server, so that the cloud server encodes the second multimedia data substream to obtain a corresponding multimedia file.

With reference to the second aspect or any one of the first to the sixth possible implementation manner of the second aspect, in a seventh possible implementation manner, the processing unit is further configured to:

configure a multimedia plug-in;

the displaying unit is specifically configured to display the multimedia data stream by using the multimedia plug-in configured by the processing unit; and the acquiring unit is specifically configured to receive, by using the multimedia plug-in configured by the processing unit, the control instruction sent by the cloud server.

By using the foregoing solutions, a client acquires a multimedia data stream, decodes the multimedia data stream, displays a decoded multimedia data stream, and implements control on the displayed multimedia data stream by using a control instruction received from a cloud server. In this way, the client no longer needs to send the multimedia data stream to the cloud server, and instead, the client directly decodes the acquired multimedia data stream, and only the control instruction is transmitted between the client and the server, thereby reducing a bandwidth occupied by transmission of the multimedia data stream in a media control process, resolving an obvious pause occurring when the multimedia data stream is being displayed, and improving user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
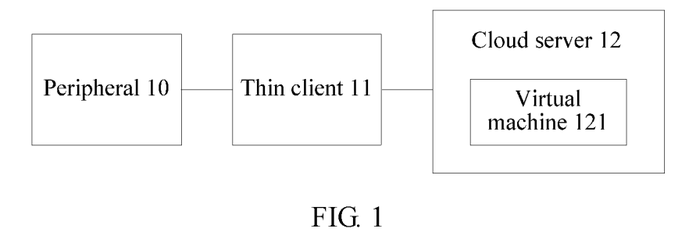
FIG. 1 is a diagram of a desktop-cloud-based media control system according to an embodiment of the present invention.

The following embodiments of the present invention are described based on media control in a desktop cloud scenario, where the desktop cloud scenario may be a remote desktop scenario or a virtual desktop scenario, and in the desktop cloud scenario, a cloud server builds a corresponding cloud desktop for a client, and the client accesses the cloud server by using the cloud desktop. As shown in FIG. 1, the desktop cloud scenario includes:

a peripheral 10, connected to a thin client 11, and provides a multimedia data stream for the thin client;

the thin client 11, connected to a cloud server 12, configured to decode the acquired multimedia data stream and display a decoded multimedia data stream, and further configured to: receive a control instruction sent by the server, and control display of the decoded multimedia data stream according to the control instruction; and the cloud server 12, including a virtual machine 121, where the cloud server allocates a virtual machine to the thin client, the virtual machine is used to provide the cloud desktop for the thin client, and the cloud server and the thin client perform data transmission by using the Remote Desktop Transmission Protocol; and is further used to receive the control instruction delivered by a user, and send the control instruction to the thin client.

Figure 2:
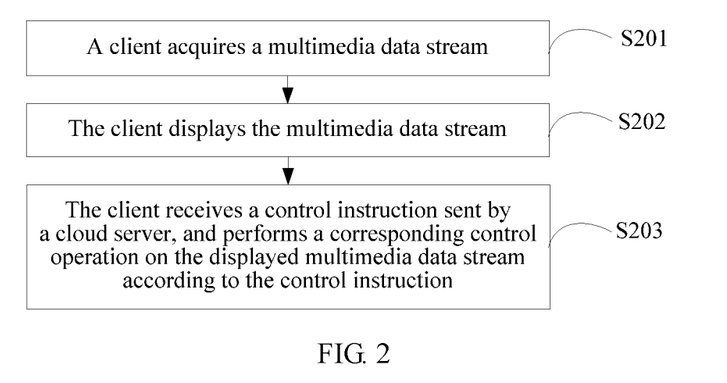
FIG. 2 is a schematic flowchart of a desktop-cloud-based media control method according to an embodiment of the present invention.

An embodiment of the present invention provides a desktop-cloud-based media control method. As shown in FIG. 2, the method is executed by a client, and the method includes:

S201. A client acquires a multimedia data stream.

The client includes a client applied to a desktop cloud scenario, and in the desktop cloud scenario, a cloud server builds a corresponding cloud desktop for the client, and the client accesses the cloud server by using the cloud desktop.

Specifically, the client includes the client applied to the desktop cloud scenario, for example, the client may be a thin client. The thin client refers to a computer terminal without an application program in an existing client-server network system. The thin client communicates with the server by using some protocols, and then accesses a local area network. The thin client transports, to the server, data input by using a mouse device and a keyboard, for processing. Then, the server transfers a processing result back to the client.

Further, the client may be externally connected to a multimedia peripheral (such as a camera or a microphone), and the client acquires the multimedia data stream by using the multimedia peripheral.

For example, if the multimedia peripheral is a camera, the camera sends a shot dynamic video to the client by using the multimedia data stream.

S202. The client displays the multimedia data stream.

Specifically, the client decodes the multimedia data stream, and displays a decoded multimedia data stream.

Specifically, the client determines a location of a display window, and displays the decoded multimedia data stream by using the display window.

The display window is used to display the decoded multimedia data stream, the location of the display window is corresponding to a multimedia display area, and the multimedia display area is an area for displaying a multimedia data stream on the cloud desktop.

In a possible implementation manner of the present invention, the client receives location information that is of the multimedia display area on the cloud desktop and sent by the cloud server, and determines the location of the display window according to the location information of the multimedia display area, so that the location of the display window is the same as a location of the multimedia display area on the cloud desktop.

The cloud server may be a virtualization server of a desktop cloud platform, that is, a physical computer that simulates multiple virtual machines, and each virtual machine is corresponding to one client. The cloud server is responsible for providing the cloud desktop for the client, and a user may access a corresponding virtual machine in the cloud server by using the cloud desktop, to implement an operation such as accessing a network resource or saving application data.

Specifically, after receiving an initialization instruction that is delivered by the user by using the cloud desktop displayed by the client, the cloud server sends the location information of the multimedia display area to the client, and the client determines the location of the display window according to the location information.

Exemplarily, after the user sends a startup instruction for a video application program to the cloud server by using the cloud desktop, the cloud server starts the corresponding video application program according to the startup instruction. In this case, the cloud server sends location information of a video display area (that is, the multimedia display area) on the cloud desktop to the client, for example, the cloud server may send coordinate information of the video display area on the cloud desktop to the client; after receiving the location information, the client determines a location of the video display area on the cloud desktop according to the location information, thereby determining that the location of the display window is the location of the video display area on the cloud desktop. That is, the display window covers the video display area on the cloud desktop, and for the user, the user sees, by using the cloud desktop displayed by the client, that the display window and the cloud desktop are located in a same plane.

S203. The client receives a control instruction sent by a cloud server, and performs a corresponding control operation on the displayed multimedia data stream according to the control instruction.

The control instruction is an instruction delivered by the user to the cloud server by using the cloud desktop, and the control instruction includes a window adjustment instruction and an operation instruction.

Further, the client is configured with a multimedia plug-in, and the client displays the multimedia data stream by using the multimedia plug-in, receives, by using the multimedia plug-in, the control instruction sent by the cloud server, and performs the corresponding control operation on the displayed multimedia data stream according to the control instruction.

Specifically, the multimedia plug-in can decode the acquired multimedia data stream, so that the client displays a decoded multimedia data stream by using the multimedia plug-in. After acquiring the control instruction delivered by the user, the cloud server may send, by using a plug-in configured in the cloud server, the control instruction to the multimedia plug-in configured in the client, and the client receives, by using the configured multimedia plug-in, the control instruction sent by the cloud server, and performs, by using the multimedia plug-in, a corresponding control operation on the displayed decoded multimedia data stream.

In this way, because the multimedia plug-in in the client decodes and displays the acquired multimedia data stream, the plug-in configured in the cloud server only needs to send the control instruction to the multimedia plug-in in the client to implement control on the displayed multimedia data stream. That is, the plug-in in the cloud server does not need to perform an operation such as decoding the multimedia data stream received from the client, and after acquiring the multimedia data stream, the client also no longer needs to send the multimedia data stream to the cloud server, and instead, the multimedia plug-in configured in the client decodes and displays the acquired multimedia data stream, and the plug-in in the cloud server only sends the control instruction to the multimedia plug-in in the client and no longer performs an operation such as decoding the multimedia data stream. Because a bandwidth occupied by transmission of the control instruction is less than a bandwidth occupied by transmission of the multimedia data stream, the bandwidth occupied by the transmission of the multimedia data stream in a media control process is reduced.

In a possible implementation manner of this embodiment of the present invention, the client performs a corresponding operation according to the received window adjustment instruction, to adjust the window.

Specifically, the client receives the window adjustment instruction sent by the cloud server, and adjusts the display window according to the window adjustment instruction.

Further, when the user needs to perform an operation on the display window, the client receives the window adjustment instruction sent by the cloud server, and performs the corresponding operation on the display window according to the window adjustment instruction.

The window adjustment instruction is an instruction delivered by the user to the cloud server by using the cloud desktop, and the window adjustment instruction may be a dragging instruction, a window enlarging instruction, or a window shrinking instruction, where the dragging instruction may be an instruction for changing a location of a display window, the window enlarging instruction may be an instruction for increasing a size of a current display window, and the window shrinking instruction may be an instruction for decreasing a size of a current display window.

For example, when the user determines to increase the size of the current display window, the user may drag, by using an input device such as a mouse device, a border of the display window on the cloud desktop displayed by the client, thereby delivering the window enlarging instruction to the cloud server, and then, after receiving the window enlarging instruction, the cloud server increases a size of the multimedia display area according to the window enlarging instruction, and sends the window enlarging instruction to the client, so that the client increases the size of the display window according to the window enlarging instruction, thereby ensuring synchronous amplification of the multimedia display area and the display window. The window enlarging instruction described in the foregoing is merely an example for illustration and is not intended for limitation. The window adjustment instruction in this embodiment of the present invention may further be a dragging instruction or a window shrinking instruction, and a specific implementation manner thereof is similar to the foregoing description about the window enlarging instruction, which is not described herein again.

In another possible implementation manner of this embodiment of the present invention, after the client receives the operation instruction, the method may include the following two implementation manners:

Manner 1: The client receives a first operation instruction sent by the cloud server, and determines a first multimedia data substream according to the first operation instruction, and the client encodes the first multimedia data substream to obtain a corresponding multimedia file, and sends the multimedia file to the cloud server.

The first operation instruction is an instruction delivered by the user to the cloud server by using the cloud desktop, for example, the first operation instruction may be a shooting instruction or a recording instruction.

Exemplarily, an example in which the multimedia data stream is a video data stream is used for description. The user delivers a recording instruction to the cloud server by using the cloud desktop that is displayed by the client to the user, the cloud server sends the recording instruction to the client, and the client determines the first multimedia data substream according to the recording instruction. For example, the user delivers a recording start instruction to the cloud server by using the cloud desktop that is displayed by the client to the user; the cloud server sends the recording start instruction to the client; the client starts to execute recording of a video according to the recording start instruction, and does not stop executing recording of the video until the client receives a recording end instruction, where a video data stream corresponding to the recorded video is the foregoing first multimedia data substream; the client encodes the video data stream to obtain a corresponding video data file (that is, the foregoing multimedia file), and sends the video data file to the cloud server; and after receiving the video data file, the cloud server may save the video data file.

Manner 2: The client receives a second operation instruction sent by the cloud server, determines a second multimedia data substream according to the second operation instruction, and sends the second multimedia data substream to the cloud server, so that the cloud server encodes the second multimedia data substream to obtain a corresponding multimedia file.

The second operation instruction is an instruction delivered by the user to the cloud server by using the cloud desktop, for example, the second operation instruction may be a shooting instruction or a recording instruction.

Exemplarily, an example in which the multimedia data stream is a video data stream is used for description. The user delivers a recording instruction to the cloud server by using the cloud desktop that is displayed by the client to the user, the cloud server sends the recording instruction to the client, and the client determines the second multimedia data substream according to the recording instruction. For example, the user delivers a recording start instruction to the cloud server by using the cloud desktop that is displayed by the client to the user; the cloud server sends the recording start instruction to the client; the client starts to execute recording of a video according to the recording start instruction, and does not stop executing recording of the video until the client receives a recording end instruction, where a video data stream corresponding to the recorded video is the foregoing second multimedia data substream; the client sends the second multimedia data substream to the cloud server; the cloud server encodes the video data stream to obtain a corresponding video data file (that is, the foregoing multimedia file); and after receiving the video data file, the cloud server may save the video data file. Only exemplary description is given herein, which is not intended for limitation.

It may be learned from the foregoing that a difference between the foregoing Manner 1 and Manner 2 is as follows: In Manner 1, the client encodes the multimedia data substream and sends an encoded multimedia data substream to the cloud server, and in Manner 2, the client sends the multimedia data substream to the cloud server, and the cloud server encodes the multimedia data substream.

It should be noted that, in Manner 1, a bandwidth occupied by the encoded multimedia data substream sent by the client to the cloud server is less than that occupied by the multimedia data substream before encoding, and therefore a bandwidth occupied in a transmission process is reduced; in Manner 2, the client sends the multimedia data substream to the cloud server, the cloud server encodes the multimedia data substream, and after the client sends the multimedia data substream to the cloud server, the cloud server no longer needs to send the encoded multimedia data substream to the client for being displayed by the client, and therefore an occupied bandwidth is also reduced.

In addition, interaction of the foregoing operation instruction and the control instruction is implemented between the cloud server and the client by using the virtual machine that is in the cloud server and corresponding to the client.

By using the foregoing solution in which an execution body is a client, the client no longer needs to send a multimedia data stream to a cloud server, and instead, the client directly decodes the acquired multimedia data stream, thereby reducing a bandwidth occupied by transmission of the multimedia data stream in a display process of the multimedia data stream, resolving an obvious pause occurring when the multimedia data stream is being displayed, and improving user experience.

Figure 3:
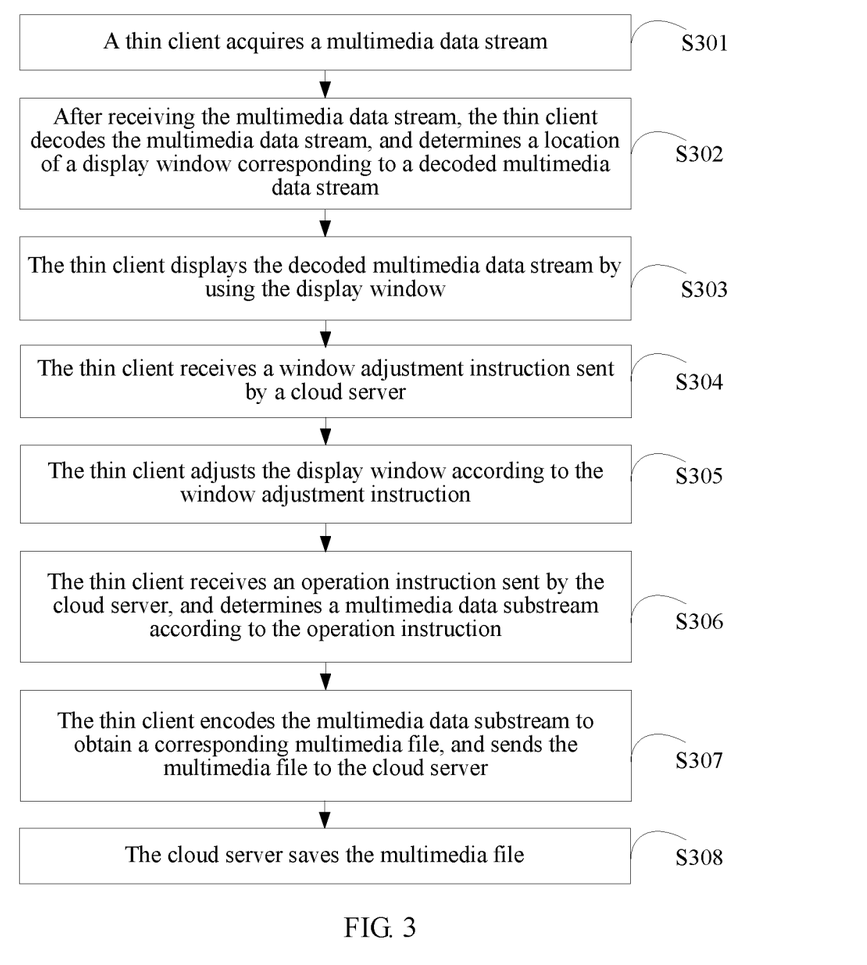
FIG. 3 is a schematic flowchart of another desktop-cloud-based media control method according to an embodiment of the present invention.

An embodiment of the present invention provides a desktop-cloud-based media control method. As shown in FIG. 3, a client in this embodiment of the present invention may be a thin client, and the method includes:

S301. A thin client acquires a multimedia data stream.

The client includes a client applied to a desktop cloud scenario, and in the desktop cloud scenario, a cloud server builds a corresponding cloud desktop for the client, and the client accesses the cloud server by using the cloud desktop.

Specifically, the thin client may be externally connected to a multimedia peripheral (such as a camera or a microphone), and the thin client acquires the multimedia data stream by using the multimedia peripheral.

For example, if the multimedia peripheral is a camera, the camera sends a shot dynamic video to the thin client by using the multimedia data stream.

S302. After receiving the multimedia data stream, the thin client decodes the multimedia data stream, and determines a location of a display window corresponding to a decoded multimedia data stream.

The display window is used to display the decoded multimedia data stream, the location of the display window is corresponding to a multimedia display area, and the multimedia display area is an area for displaying a multimedia data stream on the cloud desktop.

Specifically, after receiving an initialization instruction that is delivered by a user by using the cloud desktop displayed by the thin client, the cloud server sends location information of the multimedia display area to the thin client, and the thin client determines the location of the display window according to the location information of the multimedia display area, so that the location of the display window is the same as a location of the multimedia display area on the cloud desktop.

Exemplarily, after the user sends a startup instruction for a video application program to the cloud server by using the cloud desktop, the cloud server starts the corresponding video application program according to the startup instruction. In this case, the cloud server sends location information of a video display area (that is, the multimedia display area) on the cloud desktop to the thin client, for example, the cloud server may send coordinate information of the video display area on the cloud desktop to the thin client; after receiving the location information, the thin client determines a location of the video display area on the cloud desktop according to the location information, thereby determining that the location of the display window is the location of the video display area on the cloud desktop. That is, the display window covers the video display area on the cloud desktop, and for the user, the user sees, by using the cloud desktop displayed by the thin client, that the display window and the cloud desktop are located in a same plane.

S303. The thin client displays the decoded multimedia data stream by using the display window.

Specifically, when the user needs to perform a control operation on the display window, the following step S304 to step S305 are performed.

It should be noted that the thin client is configured with a multimedia plug-in, and the thin client displays the multimedia data stream by using the multimedia plug-in, receives, by using the multimedia plug-in, a control instruction sent by the cloud server, and performs a corresponding control operation on the displayed multimedia data stream according to the control instruction.

Specifically, the multimedia plug-in can decode the acquired multimedia data stream, so that the thin client displays a decoded multimedia data stream by using the multimedia plug-in. After acquiring the control instruction delivered by the user, the cloud server may send, by using a plug-in configured in the cloud server, the control instruction to the multimedia plug-in configured in the thin client, and the thin client receives, by using the configured multimedia plug-in, the control instruction sent by the cloud server, and performs, by using the multimedia plug-in, a corresponding control operation on the displayed decoded multimedia data stream.

In this way, because the multimedia plug-in in the thin client decodes and displays the acquired multimedia data stream, the plug-in configured in the cloud server only needs to send the control instruction to the multimedia plug-in in the thin client to implement control on the displayed multimedia data stream. That is, the plug-in in the cloud server does not need to perform an operation such as decoding the multimedia data stream received from the thin client, and after acquiring the multimedia data stream, the thin client also no longer needs to send the multimedia data stream to the cloud server; and instead, the multimedia plug-in configured in the thin client decodes and displays the acquired multimedia data stream, and the plug-in in the cloud server only sends the control instruction to the multimedia plug-in in the thin client and no longer performs an operation such as decoding the multimedia data stream. Because a bandwidth occupied by transmission of the control instruction is less than a bandwidth occupied by transmission of the multimedia data stream, the bandwidth occupied by the transmission of the multimedia data stream in a media control process is reduced.

S304. The thin client receives a window adjustment instruction sent by a cloud server.

The window adjustment instruction is an instruction delivered by the user to the cloud server by using the cloud desktop, and the window adjustment instruction may be a dragging instruction, a window enlarging instruction, or a window shrinking instruction, where the dragging instruction may be an instruction for changing a location of a display window, the window enlarging instruction may be an instruction for increasing a size of a current display window, and the window shrinking instruction may be an instruction for decreasing a size of a current display window.

S305. The thin client adjusts the display window according to the window adjustment instruction.

For example, when the user determines to increase the size of the current display window, the user may drag, by using an input device such as a mouse device, a border of the display window on the cloud desktop displayed by the thin client, thereby delivering the window enlarging instruction to the cloud server, and then, after receiving the window enlarging instruction, the cloud server increases a size of the multimedia display area according to the window enlarging instruction, and sends the window enlarging instruction to the thin client, so that the thin client increases the size of the display window according to the window enlarging instruction, thereby ensuring synchronous amplification of the multimedia display area and the display window. The window enlarging instruction described in the foregoing is merely an example for illustration and is not intended for limitation. The window adjustment instruction in this embodiment of the present invention may further be a dragging instruction or a window shrinking instruction, and a specific implementation manner thereof is similar to the foregoing description about the window enlarging instruction, which is not described herein again.

Optionally, when the user determines to perform a control operation on a part of a multimedia data stream (for example, the user needs to record a segment of a video file from a video corresponding to a video data stream or record a segment of an audio file from audio corresponding to an audio data stream), the following step S306 to step S308 are performed.

S306. The thin client receives an operation instruction sent by the cloud server, and determines a multimedia data substream according to the operation instruction.

The operation instruction is an instruction delivered by the user to the cloud server by using the cloud desktop, for example, the operation instruction may be a shooting instruction or a recording instruction.

S307. The thin client encodes the multimedia data substream to obtain a corresponding multimedia file, and sends the multimedia file to the cloud server.

S308. The cloud server saves the multimedia file.

For example, the user delivers a recording start instruction to the cloud server by using the cloud desktop that is displayed by the thin client to the user; the cloud server sends the recording start instruction to the thin client; the thin client starts to execute recording of a video according to the recording start instruction, and does not stop executing recording of the video until a recording end instruction is received by the client, where a video data stream corresponding to the recorded video is the foregoing multimedia data substream; and the thin client encodes the video data stream to obtain a corresponding video data file (that is, the foregoing multimedia file), and sends the video data file to the cloud server; the cloud server saves the video data file.

Certainly, after receiving the operation instruction sent by the cloud server, the thin client may also determine the multimedia data substream according to the operation instruction, and send the multimedia data substream to the cloud server, so that the cloud server encodes the multimedia data stream to obtain the corresponding multimedia file and saves the multimedia file.

For example, the user delivers a recording start instruction to the cloud server by using the cloud desktop that is displayed by the thin client to the user; the cloud server sends the recording start instruction to the thin client; the thin client starts to execute recording of a video according to the recording start instruction, and does not stop executing recording of the video until a recording end instruction is received by the client, where a video data stream corresponding to the recorded video is the foregoing second multimedia data substream; the thin client sends the second multimedia data substream to the cloud server; the cloud server encodes the video data stream to obtain a corresponding video data file (that is, the foregoing multimedia file), and sends the video data file to the cloud server; and the cloud server saves the video data file. Only exemplary description is given herein, which is not intended for limitation.

By using the foregoing solution, a thin client no longer needs to send a multimedia data stream to a cloud server, and instead, the thin client directly decodes the acquired multimedia data stream, thereby reducing a bandwidth occupied by transmission of the multimedia data stream in a display process of the multimedia data stream, resolving an obvious pause occurring when the multimedia data stream is being displayed, and improving user experience.

It should be noted that, with respect to the foregoing method embodiments, for ease of description, a series of action combinations are given for description. However, a person skilled in the art should know that the present invention is not limited by the described action sequence. In addition, a person skilled in the art should also understand that all the embodiments described in this specification are exemplary embodiments, and the involved actions and modules are not necessarily mandatory to the present invention.

Figure 4:
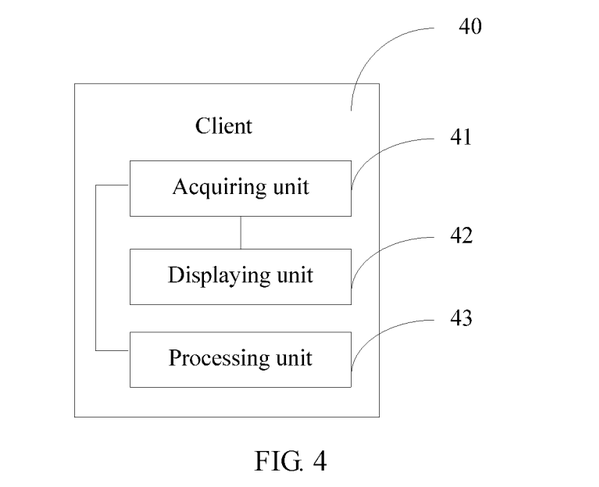
FIG. 4 is a schematic structural diagram of a client according to an embodiment of the present invention.

An embodiment of the present invention provides a client 40. As shown in FIG. 4, the client 40 includes an acquiring unit 41, a displaying unit 42, and a processing unit 43.

The acquiring unit 41 is configured to acquire a multimedia data stream.

The client includes a client applied to a desktop cloud scenario, and in the desktop cloud scenario, a cloud server builds a corresponding cloud desktop for the client, and the client accesses the cloud server by using the cloud desktop.

The displaying unit 42 is configured to display the multimedia data stream acquired by the acquiring unit 41.

The acquiring unit 41 is further configured to receive a control instruction sent by the cloud server.

The processing unit 43 is configured to perform a corresponding control operation on the displayed multimedia data stream according to the control instruction received by the acquiring unit.

Optionally, the displaying unit 42 is specifically configured to: decode the multimedia data stream acquired by the acquiring unit, and display a decoded multimedia data stream.

Optionally, the displaying unit 42 is specifically configured to: determine a location of a display window, and display the decoded multimedia data stream by using the display window.

The display window is used to display the decoded multimedia data stream, the location of the display window is corresponding to a multimedia display area, and the multimedia display area is an area for displaying a multimedia data stream on the cloud desktop.

Further, the displaying unit 42 is specifically configured to: receive location information that is of the multimedia display area on the cloud desktop and sent by the cloud server, and determine the location of the display window according to the location information of the multimedia display area, so that the location of the display window is the same as a location of the multimedia display area on the cloud desktop.

Specifically, after receiving an initialization instruction that is delivered by a user by using the cloud desktop displayed by the client, the cloud server sends the location information of the multimedia display area to the client, and the client determines the location of the display window according to the location information.

Exemplarily, after the user sends a startup instruction for a video application program to the cloud server by using the cloud desktop, the cloud server starts the corresponding video application program according to the startup instruction. In this case, the cloud server sends location information of a video display area (that is, the multimedia display area) on the cloud desktop to the client, for example, the cloud server may send coordinate information of the video display area on the cloud desktop to the client; after receiving the location information, the client determines a location of the video display area on the cloud desktop according to the location information, thereby determining that the location of the display window is the location of the video display area on the cloud desktop. That is, the display window covers the video display area on the cloud desktop, and for the user, the user sees, by using the cloud desktop displayed by the client, that the display window and the cloud desktop are located in a same plane.

Still further, the acquiring unit 41 is further configured to receive a window adjustment instruction sent by the cloud server.

The processing unit 43 is further configured to adjust the display window according to the window adjustment instruction acquired by the acquiring unit 41.

The window adjustment instruction is an instruction delivered by the user to the cloud server by using the cloud desktop, and the window adjustment instruction may be a dragging instruction, a window enlarging instruction, or a window shrinking instruction, where the dragging instruction may be an instruction for changing a location of a display window, the window enlarging instruction may be an instruction for increasing a size of a current display window, and the window shrinking instruction may be an instruction for decreasing a size of a current display window.

For example, when the user determines to increase the size of the current display window, the user may drag, by using an input device such as a mouse device, a border of the display window on the cloud desktop displayed by the client, thereby delivering the window enlarging instruction to the cloud server, and then, after receiving the window enlarging instruction, the cloud server increases a size of the multimedia display area according to the window enlarging instruction, and sends the window enlarging instruction to the client, so that the client increases the size of the display window according to the window enlarging instruction, thereby ensuring synchronous amplification of the multimedia display area and the display window. The window enlarging instruction described in the foregoing is merely an example for illustration and is not intended for limitation. The window adjustment instruction in this embodiment of the present invention may further be a dragging instruction or a window shrinking instruction, and a specific implementation manner thereof is similar to the foregoing description about the window enlarging instruction, which is not described herein again.

Figure 5:
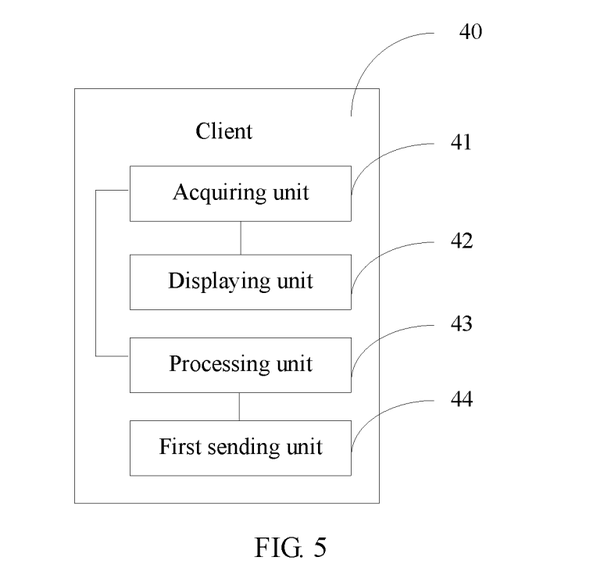
FIG. 5 is a schematic structural diagram of another client according to an embodiment of the present invention.

Optionally, as shown in FIG. 5, the acquiring unit 41 is further configured to receive a first operation instruction sent by the cloud server.

The processing unit 43 is further configured to: determine a first multimedia data substream according to the first operation instruction acquired by the acquiring unit 41, and encode the first multimedia data substream to obtain a corresponding multimedia file.

The first operation instruction is an instruction delivered by the user to the cloud server by using the cloud desktop, for example, the first operation instruction may be a shooting instruction or a recording instruction.

The client 40 further includes: a first sending unit 44, configured to send the multimedia file obtained by the processing unit 43 to the cloud server.

Exemplarily, an example in which the multimedia data stream is a video data stream is used for description. The user delivers a recording instruction to the cloud server by using the cloud desktop that is displayed by the client to the user, the cloud server sends the recording instruction to the client, and the client determines the first multimedia data substream according to the recording instruction. For example, the user delivers a recording start instruction to the cloud server by using the cloud desktop that is displayed by the client to the user; the cloud server sends the recording start instruction to the client; the client starts to execute recording of a video according to the recording start instruction, and does not stop executing recording of the video until the client receives a recording end instruction, where a video data stream corresponding to the recorded video is the foregoing first multimedia data substream; the client encodes the video data stream to obtain a corresponding video data file (that is, the foregoing multimedia file), and sends the video data file to the cloud server; and the cloud server saves the video data file.

Figure 6:
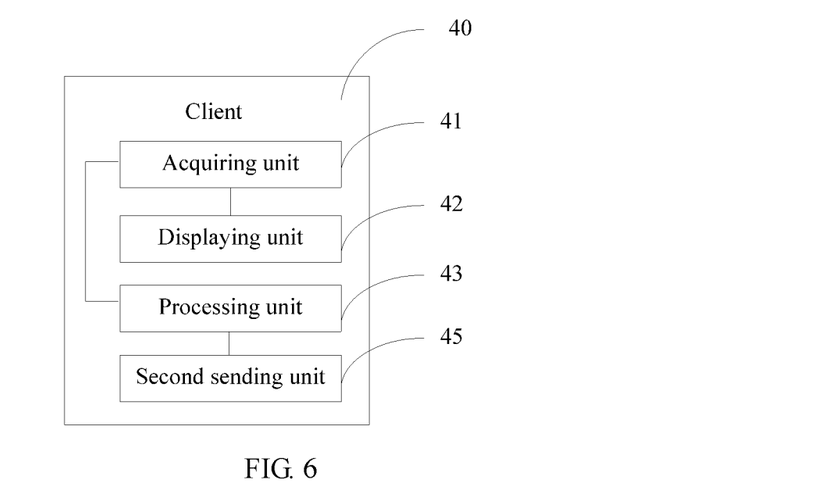
FIG. 6 is a schematic structural diagram of another client according to an embodiment of the present invention.

Optionally, as shown in FIG. 6, the acquiring unit 41 is further configured to receive a second operation instruction sent by the cloud server.

The processing unit 43 is further configured to determine a second multimedia data substream according to the second operation instruction.

The second operation instruction is an instruction delivered by the user to the cloud server by using the cloud desktop, for example, the second operation instruction may be a shooting instruction or a recording instruction.

The client 40 further includes: a second sending unit 45, configured to send the second multimedia data substream determined by the processing unit 43 to the cloud server, so that the cloud server encodes the second multimedia data substream to obtain a corresponding multimedia file.

Exemplarily, an example in which the multimedia data stream is a video data stream is used for description. The user delivers a recording instruction to the cloud server by using the cloud desktop that is displayed by the client to the user, the cloud server sends the recording instruction to the client, and the client determines the second multimedia data substream according to the recording instruction. For example, the user delivers a recording start instruction to the cloud server by using the cloud desktop that is displayed by the client to the user; the cloud server sends the recording start instruction to the client; the client starts to execute recording of a video according to the recording start instruction, and does not stop executing recording of the video until the client receives a recording end instruction, where a video data stream corresponding to the recorded video is the foregoing second multimedia data substream; the client sends the second multimedia data substream to the cloud server; the cloud server encodes the video data stream to obtain a corresponding video data file (that is, the foregoing multimedia file), and sends the video data file to the cloud server; and after receiving the video data file, the cloud server may save the video data file. Only exemplary description is given herein, which is not intended for limitation.

Further, the processing unit 43 is further configured to configure a multimedia plug-in, the displaying unit is specifically configured to display the multimedia data stream by using the multimedia plug-in configured by the processing unit, and the acquiring unit is specifically configured to receive, by using the multimedia plug-in configured by the processing unit, the control instruction sent by the cloud server.

Specifically, the multimedia plug-in can decode the acquired multimedia data stream, so that a thin client displays a decoded multimedia data stream by using the multimedia plug-in. After acquiring the control instruction delivered by the user, the cloud server may send, by using a plug-in configured in the cloud server, the control instruction to the multimedia plug-in configured in the thin client, and the thin client receives, by using the configured multimedia plug-in, the control instruction sent by the cloud server, and performs, by using the multimedia plug-in, a corresponding control operation on the displayed decoded multimedia data stream.

In this way, because the multimedia plug-in in the thin client decodes and displays the acquired multimedia data stream, the plug-in configured in the cloud server only needs to send the control instruction to the multimedia plug-in in the thin client to implement control on the displayed multimedia data stream. That is, the plug-in in the cloud server does not need to perform an operation such as decoding the multimedia data stream received from the thin client, and after acquiring the multimedia data stream, the thin client also no longer needs to send the multimedia data stream to the cloud server; and instead, the multimedia plug-in configured in the thin client decodes and displays the acquired multimedia data stream, and the plug-in in the cloud server only sends the control instruction to the multimedia plug-in in the thin client and no longer performs an operation such as decoding the multimedia data stream. Because a bandwidth occupied by transmission of the control instruction is less than a bandwidth occupied by transmission of the multimedia data stream, the bandwidth occupied by the transmission of the multimedia data stream in a media control process is reduced.

By using the client, the client no longer needs to send a multimedia data stream to a cloud server, and instead, the client directly decodes the acquired multimedia data stream, thereby reducing a bandwidth occupied by transmission of the multimedia data stream in a display process of the multimedia data stream, resolving an obvious pause occurring when the multimedia data stream is being displayed, and improving user experience.

It may be clearly understood by a person skilled in the art that, for the purpose of convenient and brief description, for a detailed working process of the foregoing client, reference may be made to a corresponding process in the foregoing method embodiments, and details are not described herein again.

Figure 7:
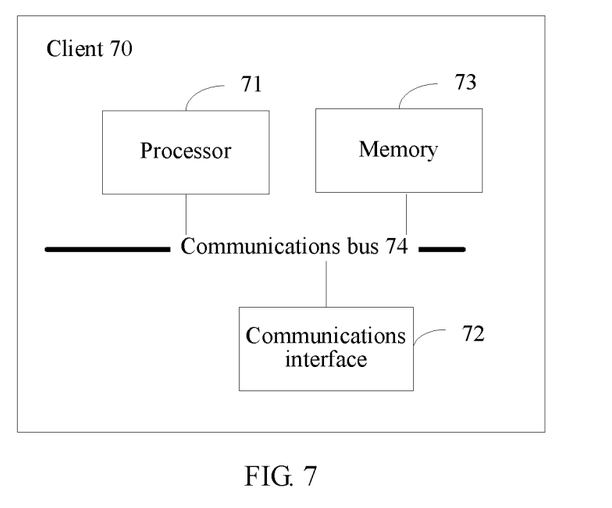
FIG. 7 is a schematic structural diagram of another client according to an embodiment of the present invention.

An embodiment of the present invention provides a client 70. As shown in FIG. 7, the client includes:

a processor (processor) 71, a communications interface (Communications Interface) 72, a memory (memory) 73, and a communications bus 74, where the processor 71, the communications interface 72, and the memory 73 complete mutual communication by using the communications bus 74.

The processor 71 may be a central processing unit CPU, or an application-specific integrated circuit ASIC (Application Specific Integrated Circuit), or one or more integrated circuits configured to implement this embodiment of the present invention.

The memory 73 is configured to store program code, where the program code includes a computer operation instruction. The memory 73 may include a high-speed RAM memory, and may further include a non-volatile memory (non-volatile memory), for example, at least one disk memory.

The communications interface 72 is configured to implement connection communication between these apparatuses.

The processor 71 executes the program code, and is configured to acquire a multimedia data stream, display the multimedia data stream, receive a control instruction sent by a cloud server, and perform a corresponding control operation on the displayed multimedia data stream according to the control instruction, where the control instruction is an instruction delivered by a user to the cloud server by using a cloud desktop.

The client includes a client applied to a desktop cloud scenario, and in the desktop cloud scenario, the cloud server builds a corresponding cloud desktop for the client, and the client accesses the cloud server by using the cloud desktop.

Optionally, the processor 71 is further configured to: decode the multimedia data stream, and display a decoded multimedia data stream.

Optionally, the processor 71 is further configured to: determine a location of a display window, and display the decoded multimedia data stream by using the display window.

The display window is used to display the decoded multimedia data stream, the location of the display window is corresponding to a multimedia display area, and the multimedia display area is an area for displaying a multimedia data stream on the cloud desktop.

Optionally, the processor 71 is further configured to: receive location information that is of the multimedia display area on the cloud desktop and sent by the cloud server, and determine the location of the display window according to the location information of the multimedia display area, so that the location of the display window is the same as a location of the multimedia display area on the cloud desktop.

Optionally, the processor 71 is further configured to: receive a window adjustment instruction sent by the cloud server, and adjust the display window according to the window adjustment instruction.

Optionally, the processor 71 is specifically configured to: receive a first operation instruction sent by the cloud server, determine a first multimedia data substream according to the first operation instruction, encode the first multimedia data substream to obtain a corresponding multimedia file, and send the multimedia file to the cloud server.

Optionally, the processor 71 is further configured to: receive a second operation instruction sent by the cloud server, determine a second multimedia data substream according to the second operation instruction, and send the second multimedia data substream to the cloud server, so that the cloud server encodes the second multimedia data substream to obtain a corresponding multimedia file.

Optionally, the processor 71 is further configured to: configure a multimedia plug-in, display the multimedia data stream by using the multimedia plug-in, and receive, by using the multimedia plug-in, the control instruction sent by the cloud server.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A desktop-cloud-based media control method by a thin client device, comprising:
   communicating with a virtual machine in a cloud server that performs cloud desktop functionality for the thin client device;
   acquiring a multimedia data stream from a peripheral device connected to the thin client;
   decoding the multimedia data stream, and displaying a decoded multimedia data stream at the thin client;
   transmitting an indication of a user operation to the virtual machine in the cloud server;
   receiving a corresponding control instruction from the virtual machine in the cloud server for controlling or processing the decoded multimedia stream, and
   performing a control operation on the displayed multimedia data stream based on the received control instruction.

2. The method according to claim 1, wherein displaying the decoded multimedia data stream comprises:
   determining a location of a display window that is to be generated on the thin client for displaying the decoded multimedia data stream within a desktop window; and
   displaying the decoded multimedia data stream being displayed within the display window.

3. The method according to claim 2, wherein the receiving the corresponding control instruction from the virtual machine in the cloud server and performing the control operation comprises:
   receiving a window adjustment instruction sent by the virtual machine in the cloud server; and
   adjusting the display window according to the window adjustment instruction.

4. The method according to claim 2, wherein the location of the display window is corresponding to a multimedia display area, and the multimedia display area is an area for displaying a multimedia data stream on the virtual machine, the display window is overlapped with the multimedia display area.

5. The method according to claim 1, wherein the receiving the corresponding control instruction from the virtual machine in the cloud server and performing the control operation on the displayed multimedia data stream comprises:
   receiving a first operation instruction sent by the virtual machine in the cloud server;
   determining a first multimedia data substream according to the first operation instruction;
   encoding the first multimedia data substream to produce a corresponding multimedia file; and
   sending the multimedia file to the cloud server.

6. The method according to claim 1, wherein the receiving the corresponding control instruction from the virtual machine in the cloud server and performing the control operation on the displayed multimedia data stream comprises:
   receiving a second operation instruction sent by the virtual machine in the cloud server;
   determining a second multimedia data substream according to the second operation instruction; and
   sending the second multimedia data substream to the cloud server, so that the cloud server encodes the second multimedia data substream to obtain a corresponding multimedia file.

7. The method according to claim 1, wherein the method further comprises:
   displaying the multimedia data stream by using a multimedia plug-in; and
   receiving the corresponding control instruction from the virtual machine in the cloud server further comprises:
   receiving the control instruction from the virtual machine in the cloud server by using the multimedia plug-in.

8. A thin client device applied in desktop cloud scenario, comprising:

a processor, a communications interface, a memory, and a communications bus, where the processor, the communications interface, and the memory complete mutual communication by using the communications bus;

the memory is configured to store program code, where the program code includes computer operation instructions;

the processor executes the computer operation instructions to perform the steps of:

communicating with a virtual machine in a cloud server that performs cloud desktop functionality for the thin client device;

acquiring a multimedia data stream from a peripheral device connected to the thin client device;

decoding the multimedia data stream, and display a decoded multimedia data stream at the thin client;

transmitting an indication of a user operation to the virtual machine in the cloud server;

receiving a corresponding control instruction from the virtual machine in the cloud server for controlling or processing the decoded multimedia stream; and performing a control operation on the displayed multimedia data stream based on the received control instruction.

9. The thin client device according to claim 8, wherein the displaying the decoded multimedia data stream comprises:

determining a location of a display window that is to be generated on the thin client for displaying the decoded multimedia data stream within a desktop window; and displaying the decoded multimedia data stream being displayed within the display window.

10. The thin client device according to claim 9, wherein the receiving the corresponding control instruction from the virtual machine in the cloud server, and performing the control operation on the displayed multimedia data stream comprises:

receiving a window adjustment instruction sent by virtual machine in the cloud server; and adjusting the display window according to the window adjustment instruction.

11. The thin client device according to claim 9, wherein the location of the display window is corresponding to a multimedia display area, and the multimedia display area is an area for displaying a multimedia data stream on the virtual machine, the display window is overlapped with the multimedia display area.

12. The thin client device according to claim 8, wherein the receiving the corresponding control instruction from the virtual machine in the cloud server, and performing the control operation on the displayed multimedia data stream comprises:

receiving a first operation instruction sent by the virtual machine in the cloud server;

determining a first multimedia data substream according to the first operation instruction;

encoding the first multimedia data substream to produce a corresponding multimedia file; and sending the multimedia file to the cloud server.

13. The thin client device according to claim 8, wherein the receiving the corresponding control instruction from the virtual machine in the cloud server, and performing the control operation on the displayed multimedia data stream comprises:

receiving a second operation instruction sent by the virtual machine in the cloud server;

determining a second multimedia data substream according to the second operation instruction; and sending the second multimedia data substream to the cloud server, so that the cloud server encodes the second multimedia data substream to obtain a corresponding multimedia file.

* * * * *